(12) United States Patent
Shishido et al.

(10) Patent No.: US 7,753,590 B2
(45) Date of Patent: Jul. 13, 2010

(54) BEARING UNIT AND DRIVING MOTOR USING THE BEARING UNIT

(75) Inventors: Yuji Shishido, Kanagawa (JP); Kenichiro Yazawa, Tokyo (JP); Makoto Chiyoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 474 days.

(21) Appl. No.: 11/758,312

(22) Filed: Jun. 5, 2007

(65) Prior Publication Data

US 2007/0280570 A1 Dec. 6, 2007

(30) Foreign Application Priority Data

Jun. 6, 2006 (JP) ............................... 2006-157756

(51) Int. Cl.
*F16C 32/06* (2006.01)

(52) U.S. Cl. ...................................... 384/107; 384/123

(58) Field of Classification Search ................. 384/100, 384/106–107, 112, 114–115, 119, 121, 123, 384/130, 132, 135; 310/90; 360/98.07, 99.08
See application file for complete search history.

(56) References Cited

U.S. PATENT DOCUMENTS

| | | | | |
|---|---|---|---|---|
| 5,715,116 A * | 2/1998 | Moritan et al. | ............... | 384/107 |
| 5,785,429 A * | 7/1998 | Jeong | ......................... | 384/397 |
| 5,988,889 A * | 11/1999 | Barnhart et al. | ............. | 384/441 |
| 6,336,745 B1 * | 1/2002 | Horng et al. | ................. | 384/107 |
| 6,369,981 B2 * | 4/2002 | Nii et al. | .................. | 360/99.08 |
| 6,404,087 B1 * | 6/2002 | Ichiyama | ..................... | 384/107 |
| 6,698,930 B2 * | 3/2004 | Akizuki et al. | .............. | 384/106 |
| 6,768,236 B2 * | 7/2004 | Tokunaga et al. | ............. | 310/90 |
| 7,005,768 B2 * | 2/2006 | Tamaoka et al. | ............ | 384/132 |
| 7,008,112 B2 * | 3/2006 | Yamashita et al. | .......... | 384/107 |
| 7,021,829 B2 * | 4/2006 | Tamaoka | ..................... | 384/112 |
| 7,048,444 B2 * | 5/2006 | Kurimura et al. | ........... | 384/119 |
| 7,077,572 B2 * | 7/2006 | Horng et al. | ................. | 384/114 |
| 7,296,931 B2 * | 11/2007 | Kurimura et al. | ........... | 384/107 |
| 7,435,002 B2 * | 10/2008 | Nakagawa et al. | .......... | 384/107 |
| 7,547,143 B2 * | 6/2009 | Addy | ......................... | 384/107 |

FOREIGN PATENT DOCUMENTS

JP          9-219058          8/1997

(Continued)

*Primary Examiner*—Marcus Charles
(74) *Attorney, Agent, or Firm*—Oblon, Spivak, McClelland, Maier & Neustadt, L.L.P.

(57) ABSTRACT

A bearing unit includes: a radial bearing for bearing in a circumferential direction of a shaft; a thrust bearing for bearing one end in a thrust direction of the shaft; a housing provided on the outside of the radial bearing and the thrust bearing and filled with a viscous fluid; a seal member united with the housing so as to contain the radial bearing and the thrust bearing in a sealed state, the seal member having a shaft passing hole through which the shaft is passed; and a passage for discharging air present inside the housing, the passage formed between the housing and the radial bearing, and the passage providing communication between the one end side and the other end side in the thrust direction of the shaft projecting from the radial bearing, wherein the cross-sectional shape of the passage is a shape including at least one acute angle.

10 Claims, 6 Drawing Sheets

FOREIGN PATENT DOCUMENTS

| | | |
|---|---|---|
| JP | 2001-107969 | 4/2001 |
| JP | 2001-112214 | 4/2001 |
| JP | 2002-61648 | 2/2002 |
| JP | 2003-314536 | 11/2003 |
| JP | 2004-132479 | 4/2004 |
| JP | 2006-112614 | 4/2006 |

* cited by examiner

BEARING UNIT AND DRIVING MOTOR USING THE BEARING UNIT

CROSS REFERENCES TO RELATED APPLICATIONS

The present invention contains subject matter related to Japanese Patent Application JP 2006-157756, filed in the Japanese Patent Office on Jun. 6, 2006, the entire contents of which being incorporated herein by reference.

BACKGROUND OF THE INVENTION

1. Field of the Invention

The present invention relates to a bearing unit for rotatably bearing a rotating shaft or for bearing a rotating body rotatably relative to a shaft, and to a driving motor using the bearing unit.

2. Description of Related Art

As a bearing unit for rotatably bearing a rotating shaft, there has been known a bearing unit configured as shown in FIG. 12. This bearing unit 100, for rotatably bearing a rotating shaft 101, has a structure in which a radial bearing 103 for rotatably bearing the rotating shaft 101 is attached to a metallic housing 102 having a tubular shape opened at its one end. A thrust bearing 104 for bearing in the thrust direction of the rotating shaft 101 rotatably borne by the radial bearing 103 is attached to one open end side of the housing 102.

In the bearing unit 100, a dynamic pressure fluid bearing is used as the radial bearing 103. The dynamic pressure fluid bearing has a structure in which the inner peripheral surface, facing the rotating shaft 101, of the radial bearing 103 is provided with dynamic pressure generating grooves for generating a dynamic pressure.

The housing 102 is filled with a lubricating oil, which is a viscous fluid for generating a dynamic pressure by flowing in the dynamic pressure generating grooves when the rotating shaft 101 is rotated.

The rotating shaft 101 is inserted in the radial bearing 101, and is rotatably borne in the housing 102 with its one end side borne by the thrust bearing 104.

On the other open end side of the housing 102, there is provided a joint part 107 to which a metallic ring-shaped oil seal 105 for preventing the lubricating oil filling the housing 102 from leaking out of the housing 102 is attached. The rotating shaft 101 is projected to the outside of the housing 102 through a shaft passing hole 106 provided in a central portion of the oil seal 105.

A surface active agent is applied to the inner peripheral surface of the oil seal 105 so as to prevent the lubricating oil from being moved through the shaft passing hole 106 to the outside of the housing 102 by a centrifugal force generated upon rotation of the rotating shaft 101 or by other cause.

In the bearing unit 100 configured as shown in FIG. 12, the possible route of outflow of the lubricating oil filling the inside of the housing 102 is only a gap 108 formed between the outer peripheral surface of the rotating shaft 101 and the inner peripheral surface of the shaft passing hole 106 provided in the oil seal 105. Here, by setting the width of the gap 108 to be small, it is ensured that the leakage of the lubricating oil to the exterior of the housing 102 can be prevented by the surface tension of the lubricating oil fronting on the gap 108.

Furthermore, the outer peripheral surface, facing the inner peripheral surface of the shaft passing hole 106, of the rotating shaft 101 is provided with a taper part 109 gradually reduced in diameter along the direction toward the outside of the housing 102. With such a taper part 109 provided, a pressure gradient is created in the gap 108 formed between the outer peripheral surface of the rotating shaft 101 and the inner peripheral surface of the shaft passing hole 106, and due to a centrifugal force generated upon rotation of the rotating shaft 101, a force tending to draw the lubricating oil filling the housing 102 into the inside of the housing 102 is generated. Since the lubricating oil tends to be drawn into the inside of the housing 102 when the rotating shaft 101 is rotated, the lubricating oil penetrates into the dynamic pressure generating grooves of the radial bearing 103 configured as a dynamic pressure fluid bearing, to produce a dynamic pressure, whereby stable bearing of the rotating shaft 101 is realized, and the lubricating oil filling the inside of the housing 102 can be prevented from leaking.

However, the above-mentioned bearing unit 100 has the following problem. When the rotating shaft 101 and the housing 102 are put into relative rotation and a dynamic pressure is thereby generated, the static pressure inside the bearing unit 100 is lowered extremely. The lowering of the pressure inside the housing 102 leads to expansion of residual air, such as a tiny amount of air remaining in the inside of the housing 102 and air dissolved in the viscous fluid, e.g., lubricating oil. Due to the expansion of the air inside the housing 102 or the air dissolved in the viscous fluid, the viscous fluid is pushed out to the exposed side of the rotating shaft 101, possibly leaking to the outside. Thus, in this type of bearing unit 100, the lubricating oil would leak or be difficult to retain, whereby it is made very difficult to achieve favorable lubrication.

Thus, the bearing unit 100 shown in FIG. 12 has the problem that the generation of the dynamic pressure upon relative rotation of the rotating shaft 101 and the housing 102 may cause expansion of the residual air inside the housing 102, leading to leakage of the lubricating oil.

For solving this problem, it may be contemplated to adopt a bearing unit which, in addition to the above-mentioned configuration of bearing unit, is provided with a communicating passage for circulation of air by providing communication between one end side and the other end side in the thrust direction of the rotating shaft projecting from the radial bearing. Such a bearing unit, with the communicating passage, can prevent the pressure on the shaft non-open side from being lowered and, by discharging the residual air inside the housing to the exterior through the shaft passing hole, can prevent the leakage of the lubricating oil.

In addition, the communicating passage can solve the problem of the related art in that it is difficult to insert the shaft after assemblage of the housing and the like, since the clearance between the rotating shaft and the radial bearing is usually as small as a few micrometers and the lubricating oil is already present. To be more specific, the communicating passage plays the role of air vent at the time of insertion of the rotating shaft, thereby facilitating the insertion of the rotating shaft.

However, the communicating passage in the bearing unit as above has been set substantially arcuate in cross-sectional shape, taking into account the ease of manufacturing process. Due to such a sectional shape, there has been the problem that the lubricating oil placed to fill the inside of the housing may stagnate in the air path (communicating hole) to plug up the air path, whereon the communicating hole cannot satisfactorily function as air path.

For more information, refer to Japanese Patent Laid-open No. 2004-132479.

SUMMARY OF THE INVENTION

Thus, there is a need for a bearing unit which, provided with a passage capable of securely functioning as air path, can prevent the pressure inside a housing from being lowered due to relative rotation of a shaft and the housing and can prevent the leakage of a viscous fluid inside the housing from occurring due to expansion of residual air. There is also a need for a driving motor using such a bearing unit.

According to an embodiment of the present invention, there is provided a bearing unit including: a radial bearing for bearing in a circumferential direction of a shaft; a thrust bearing for bearing one end in a thrust direction of the shaft; a housing provided on the outside of the radial bearing and the thrust bearing, the housing filled with a viscous fluid; a seal member united with the housing so as to contain the radial bearing and the thrust bearing in a sealed state, the seal member having a shaft passing hole through which the shaft is passed; and a passage for discharging air present inside the housing, the passage formed between the housing and the radial bearing, and the passage providing communication between the one end side and the other end side in the thrust direction of the shaft projecting from the radial bearing, wherein the cross-sectional shape of the passage is a shape including at least one acute angle.

According to another embodiment of the present invention, there is provided a driving motor including a bearing unit for bearing a rotor rotatably relative to a stator, wherein the bearing unit is configured as described just above.

In the bearing unit and the driving motor using the bearing unit as above-mentioned, the passage as air path is provided, and the passage is prevented from being plugged up with the viscous fluid and is permitted to securely function as air path. It is thereby made possible to prevent the pressure inside the housing from being lowered upon relative rotation of the shaft and the housing, to prevent leakage of the viscous fluid present inside the housing from being caused by expansion of residual air due to a lowering in pressure, to retain the lubricating oil for a long period of time, and to maintain a good lubrication performance.

DETAILED DESCRIPTION OF THE PREFERRED EMBODIMENTS

Figure 1:
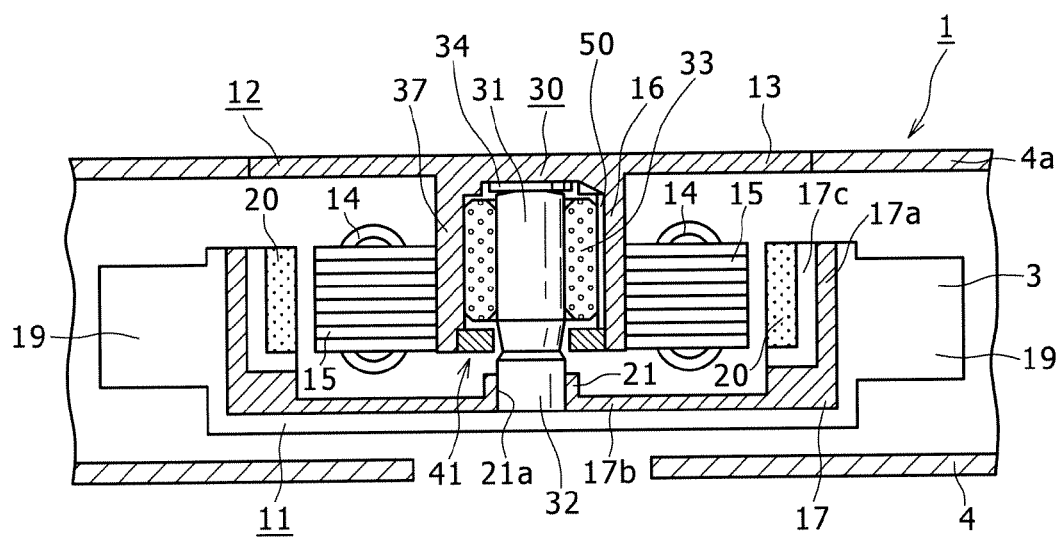
FIG. 1 is a sectional view showing the configuration of a driving motor to which the present invention is applied.

Now, embodiments of a bearing unit and a driving motor using the bearing unit, to which the present invention is applied, will be described below referring to the drawings.

Here, description will be made of a driving motor used for a radiating device provided in an electronic apparatus, such as a portable computer, which is an information processing system for performing arithmetic processing or the like of various kinds of information. The radiating device is provided inside the portable computer or the like. The radiating device includes a metallic base, a driving motor 1 mounted to the base, a fan 3 driven to rotate by the driving motor 1, a fan case 4 containing the fan 3 therein, and a heat sink. The driving motor 1 for driving the fan 3 of the radiating device to rotate will be described in detail.

As shown in FIG. 1, the driving motor 1 using a bearing unit 30 to which the present invention is applied has a rotor 11 and a stator 12.

The stator 12 is integrally provided on the side of a top plate 4a of the fan case 4 in which the fan 3 driven to rotate by the driving motor 1 is contained together with the driving motor 1. The stator 12 includes a stator yoke 13, the bearing unit 30 to which the present invention is applied, a coil 14, and a core 15 around which the coil 14 is wound. The stator yoke 13 may be formed as one body with the top plate 4a of the fan case 4, i.e., constituted of a part of the fan case 4, or may be formed separately from the fan case 4. The bearing unit 30 is fixed in a holder 16 formed in a hollow cylindrical shape and provided as one body with a central portion of the stator yoke 13. The holder 16 is integrally formed with a housing 37 of the bearing unit 30 which will be described later. Incidentally, while the housing of the bearing unit 30 is here formed as one body with the holder 16 for the purpose of realizing a simplified assembly process, this configuration is not limitative; for example, the housing and the holder may be provided as separate bodies and they may be fixed to each other by either one or both of press fitting and adhesion. Further, the manner of fixing the bearing unit 30 to the holder 16 is not limited to the above-mentioned one; for example, fixation by caulking or fixation by engagement of an elastic projected part or the like may also be adopted.

As shown in FIG. 1, the core 15 around which the coil 14 supplied with a driving current is wound is attached to an outer peripheral part of the bearing unit 30 integrally fixed to the stator yoke 13.

The rotor 11, which constitutes the driving motor 1 together with the stator 12, is mounted to a rotating shaft 31 rotatably borne by the bearing unit 30, and is rotated as one body with the rotating shaft 31. The rotor 11 has a rotor yoke 17, and the fan 3 having a plurality of vanes 19 rotated as one body with the rotor yoke 17. The vanes 19 of the fan 3 are formed integrally with the rotor yoke 17 by outsert molding thereof on the outer peripheral surface of the rotor yoke 17.

A ring-shaped rotor magnet 20 is provided on the inner peripheral surface of a tubular part 17a of the rotor yoke 17 so as to face the coil 14 of the stator 12. This magnet 20 is a plastic magnet provided with S poles and N poles arranged alternately along the circumferential direction, and is fixed to a rotor case 17c at the inner peripheral surface of the rotor yoke 17.

The rotor yoke 17 is mounted to be rotatable as one body with the rotating shaft 31, by a method in which a boss part 21 having a through-hole 21a provided in a central portion of a flat plate part 17b is press fitted into an attaching part 32 provided on the tip side of the rotating shaft 31 borne by the bearing unit 30.

In the driving motor 1 configured as above, when a driving current in a predetermined current passing pattern is supplied from a driving circuit part provided in the exterior of the driving motor 1 to the coil 14 on the stator 12 side, the rotor 11 is rotated as one body with the rotating shaft 31 under the actions of a magnetic field generated in the coil 14 and magnetic fields supplied from the rotor magnet 20 on the rotor 11 side. With the rotor 11 thus rotated, the fan 3 having the plurality of vanes 19 attached to the rotor 11 is also rotated as one body with the rotor 11. With the fan 3 thus rotated, air in the exterior of the apparatus is sucked in through an opening formed in a casing of the computer, the air is circulated inside the casing, and, while flowing in the heat sink provided inside the casing, is exhausted through a through-hole to the exterior of the casing, whereby the heat generated from heat generating elements is discharged to the exterior of the computer body, and the computer body is cooled.

Now, the bearing unit 30 used for the driving motor 1 will be described more in detail below.

Figure 2:
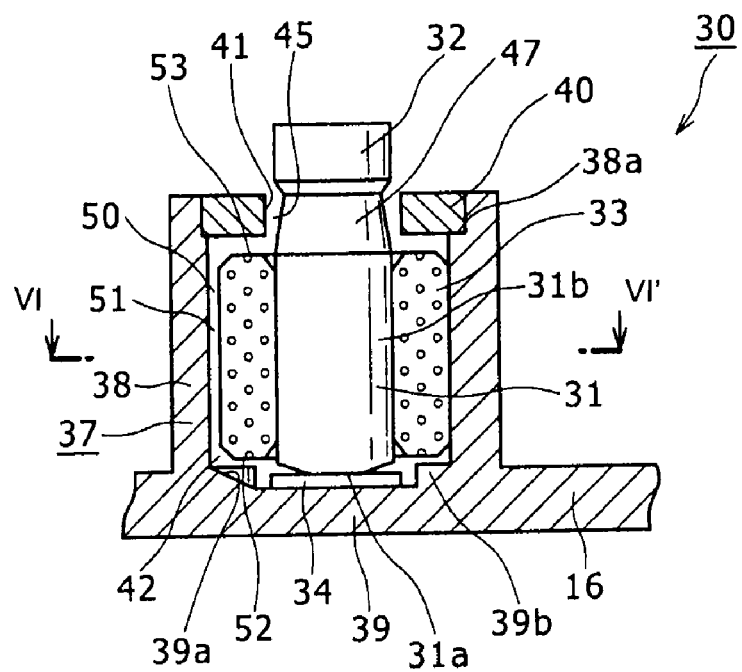
FIG. 2 is a sectional view of a bearing unit to which the present invention is applied.

As shown in FIGS. 1 and 2, the bearing unit 30 for rotatably bearing the rotating shaft 31 of the driving motor 1 described above includes a radial bearing 33 for bearing in the circumferential direction of the rotating shaft 31, a thrust bearing 34 for bearing one end in the thrust direction of the rotating shaft 31, a housing 37 containing the radial bearing 33 and the thrust bearing 34 therein, and a communicating passage(s) 50 formed between the housing 37 and the radial bearing 33 to function as an air flow passage(s) (hereinafter referred to also as "air path(s)") for exhausting residual air or the like present inside the housing.

The radial bearing 33 is formed of a sintered metal in a hollow cylindrical shape. The radial bearing 33 constitutes a dynamic pressure fluid bearing together with a lubricating oil 42 serving as a viscous fluid with which the housing 37 is filled. In the radial bearing 33, the inner peripheral surface along which to insert the rotating shaft 31 is provided with dynamic pressure generating grooves 43, 44.

Figure 3:
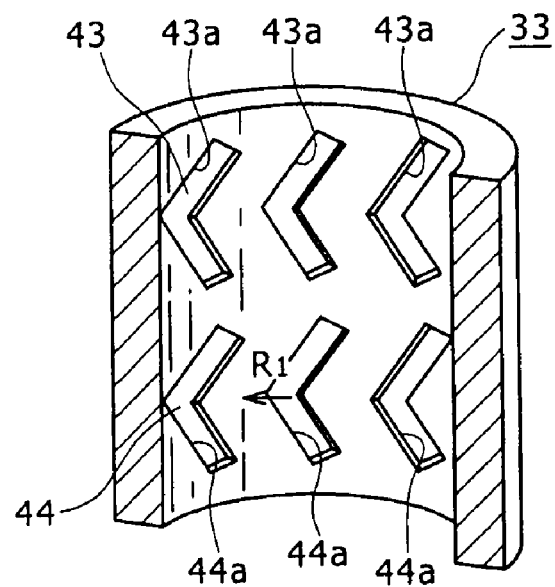
FIG. 3 is a perspective view showing dynamic pressure generating grooves formed in the inner peripheral surface of a radial bearing.

As shown in FIG. 3, the dynamic pressure generating grooves 43, 44 are configured by providing the inner peripheral surface of the radial bearing 33 with a plurality of V-shaped pairs of grooves 43a, 44a arranged along the circumferential direction. The dynamic pressure generating grooves 43, 44 are so formed that the tip side of the V-shaped pattern of each pair of grooves 43a, 44a is directed in the rotating direction R1 of the rotating shaft 31. The dynamic pressure generating grooves 43, 44 are arrayed in upper and lower rows spaced from each other along the axial direction of the hollow cylindrical radial bearing 33; specifically, the dynamic pressure generating grooves 43 are formed on the shaft exposed side on which the shaft is released (opened), while the dynamic pressure generating grooves 44 are formed on the shaft non-exposed side on which the shaft is not released (opened), i.e., on the side of the thrust bearing 34 which will be described later. The number and size of the dynamic pressure generating grooves 43, 44 provided in the radial bearing 33 are appropriately selected according to the size and length of the radial bearing 33 and the like factors. Incidentally, the radial bearing 33 may be formed of brass, stainless steel or a polymeric material. Besides, while the dynamic pressure generating grooves are formed here in plurality and in V-shaped pairs, this configuration is not limitative; for example, the so-called herring bone shape may be adopted in which a plurality of V-shaped grooves are formed in the inner peripheral surface so as to be connected to each other by link grooves in the circumferential direction.

Incidentally, while the radial bearing 33 is formed here as a so-called dynamic pressure fluid bearing having dynamic pressure generating grooves, the radial bearing constituting the bearing unit to which the present invention is applied is not limited to this configuration, and may be any one that serves for bearing in the circumferential direction of the rotating shaft 31; for example, the radial bearing may be a sliding bearing, an oil-impregnated sintered bearing or the like.

In the radial bearing 33 formed as a dynamic pressure fluid bearing, when the rotating shaft 31 passed through the radial bearing 33 is rotated continuously in the direction of arrow R1 in FIG. 3 with a center axis CL as a center, the lubricating oil 42 placed to fill the inside of the housing 37 flows in the dynamic pressure generating grooves 43, 44, to generate a dynamic pressure between the outer peripheral surface of the rotating shaft 31 and the inner peripheral surface of the radial bearing 33, whereby the rotating shaft 31 being in rotation is borne. The dynamic pressure generated in this instance realizes smooth rotation of the rotating shaft 31.

Figure 4:
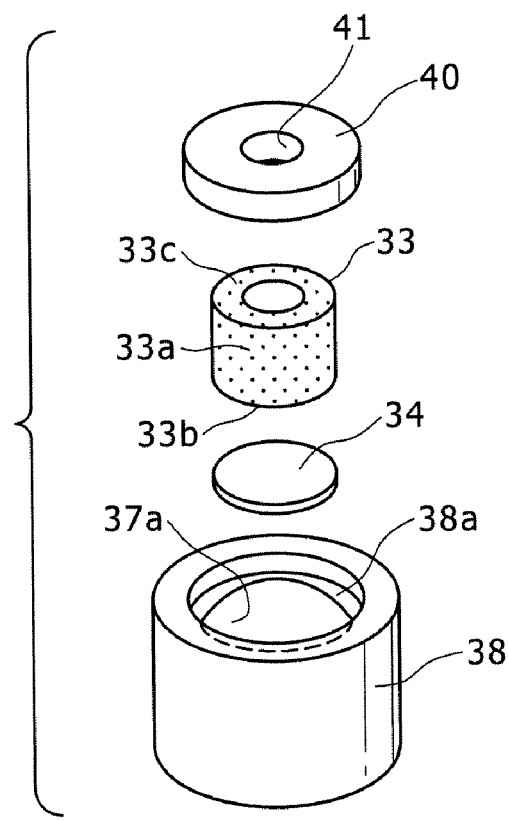
FIG. 4 is an exploded perspective view of the bearing unit to which the present invention is applied.
Figure 5:
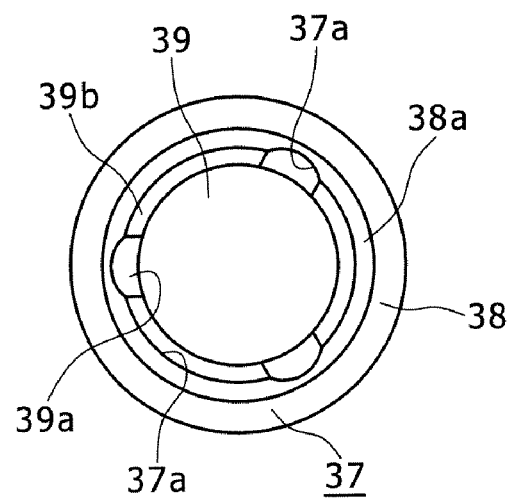
FIG. 5 is a plan view of a housing body constituting the bearing unit.

As shown in FIGS. 2, 4 and 5, the housing 37 has a housing body 38 formed in a tubular shape so as to surround the outer periphery of the radial bearing 33, and a bottom closing part 39 constituting a one end side part formed integrally with the housing body 38 so as to close one end side of the housing body 38. At the other end of the housing body 38, a seal member 40 formed in a substantially annular shape for closing an opening part on the other end side of the housing body 38 is provided in a fastening part 38a provided at the opening part.

The thrust bearing 34 for rotatably bearing a bearing support part 31a provided on one end side in the thrust direction of the rotating shaft 31 borne by the radial bearing 33 is provided at a central portion on the inner surface side of the bottom closing part 39.

The thrust bearing 34 is formed of a resin, as a pivot bearing for supporting, at a point, the bearing support part 31a of the rotating shaft 31 which is formed in an arcuate shape or a tapered shape. Incidentally, the thrust bearing 34 may be provided as one body with the bottom closing part of the housing 37.

The seal member 40 is provided in its central portion with a shaft passing hole 41 through which to pass the rotating shaft 31 rotatably borne by the radial bearing 33 contained in the housing 37. Namely, the annular inner peripheral surface of the seal member 40 constitutes the shaft passing hole 41.

The housing 37 and the seal member 40 are united by adhesion or the like, whereby they are so formed as to sealingly contain the radial bearing 33 and the thrust bearing 34 and to have the shaft passing hole 41 through which the rotating shaft 31 is passed.

The shaft passing hole 41 is formed to have an inside diameter slightly greater than the outside diameter of a shaft part body 31b so that the rotating shaft 31 passed through the shaft passing hole 41 is rotated without making frictional contact with the inner peripheral surface of the shaft passing hole 41. In this case, the shaft passing hole 41 is so formed that a gap 45 with a spacing large enough to prevent the lubricating oil 42 filling the inside of the housing 37 from leaking out of the housing 37 is provided between the inner peripheral surface of the shaft passing hole 41 and the outer peripheral surface of the shaft part body 31b. The seal member 40 formed with the shaft passing hole 41 so as to form, between itself and the rotating shaft 31, the gap 45 designed to prevent the leakage of the lubricating oil 42 filling the inside of the housing 37, functions as an oil seal part.

The rotating shaft 31 is provided with a taper part 47 at its outer peripheral surface facing the inner peripheral surface of the shaft passing hole 41. The taper part 47 is so inclined that the gap 45 formed between the outer peripheral surface of the rotating shaft 31 and the inner peripheral surface of the shaft passing hole 41 is enlarged along the direction toward the outside of the housing 37. The taper part 47 produces a pressure gradient in the gap 45 defined by the outer peripheral surface of the rotating shaft 31 and the inner peripheral surface of the shaft passing hole 41, thereby generating a force for drawing the lubricating oil 42 filling the inside of the housing 37 into the inside of the housing 37. Thus, when the rotating shaft 31 is in rotation, the lubricating oil 42 is drawn into the inside of the housing 37. Therefore, the lubricating oil 42 assuredly penetrates into the dynamic pressure generating grooves 43, 44 of the radial bearing 33 configured as a dynamic pressure fluid bearing, to generate a dynamic pressure, whereby stable bearing of the rotating shaft 31 is realized, and the lubricating oil 42 filling the inside of the housing 37 can be prevented from leaking.

The synthetic resin material constituting the housing 37 is not particularly limited; however, since the housing 37 is integrally formed with a passage forming member 34, it is preferable to use a synthetic resin material with excellent lubricity. For example, the housing 37 is formed of POM (polyacetal) or the like. Other examples of the material usable for the housing 37 include fluorine-containing synthetic resins such as polyimide and polyamide, polytetrafluoroethylene (Teflon®), such synthetic resins as nylon, and so on. Further examples of the usable material include such synthetic resins as PC (polycarbonate), ABS (acrylonitrile-butadiene-styrene), liquid polymer, etc.

As shown in FIG. 2, the rotating shaft 31 is supported on the housing 37 in the condition wherein the bearing support part 31a on one end side is borne by the thrust bearing 34, the outer peripheral surface of the shaft part body 31b is borne by the radial bearing 33, and its side of the attaching part 32 provided on the other end side is projected through the shaft passing hole 41 provided at a top closing part 40 of the housing body 38. The attaching part 32 is equipped with, for example, the rotor 11 of the driving motor 1. Here, the shaft part body 31b and the attaching part 32 are formed to be approximately equal in diameter.

A communicating passage(s) 50 is formed between the housing 37 and the radial bearing 33. The communicating passage 50 provides communication between one end part and the other end part, in the thrust direction of the rotating shaft 31, projected from the radial bearing 33. More specifically, the communicating passage 50 provides communication between one end side, or bottom face side, where the thrust bearing 34 is provided and the other end side, or top face side, where the seal member 40 is provided.

Figure 6:
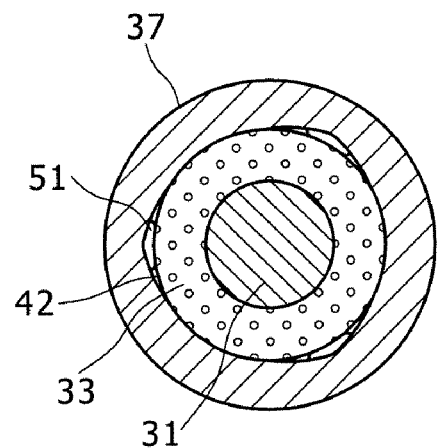
FIG. 6 is a sectional view taken along line VI-VI' of FIG. 2, showing communicating passages in the bearing unit to which the present invention is applied.

As shown in FIGS. 2 and 6, the communicating passage 50 includes: a first passage 51 formed in the thrust direction between the outer peripheral surface 33a of the radial bearing 33 and the inner peripheral surface 37a of the housing body 38 of the housing 37; a second passage 52 formed between a bottom surface 33b as a surface on one end side, where the thrust bearing 34 is provided, of the radial bearing 33 and the bottom closing part 39 of the housing 37; and a third passage 53 formed between a top surface 33c as a surface on the other end side, opposite to the one end side, of the radial bearing 33 and the seal member 40 of the housing 37.

The first passage 51 is formed substantially along the axial direction of the rotating shaft 31. The sectional shape, in a plane orthogonal to the axial direction, of the first passage 51 is a shape containing at least one acute angle. The acute angle in the sectional shape of the first passage 51 is so set that it can produce capillarity and secure the air path.

In order to form such a first passage 51, the outer peripheral surface of the radial bearing 33 is formed in a substantially hollow cylindrical shape, while the inner peripheral surface 37a is formed in tubular shape with a three-arc sectional shape obtained by a combination of a polygon with arcs. Here, the three-arc shape is a shape obtained by combining a triangle with arcs, i.e., a roughly triangular shape in which the edges of a triangle are formed like arcs.

Thus, between the housing 37 of which the inner peripheral surface 37a has a three-arc sectional shape and the radial bearing 33 of which the outer peripheral surface has a circular sectional shape, there are formed the first passages 51 at three positions on the circumference. The section of each of the first passages 51 is so formed that, at least at one end position in the circumferential direction of the section, it makes contact with the peripheral surface of the radial bearing 33 at a smaller angle as compared with the radial direction at the central position in the circumferential direction of the section; in other words, the sectional shape is a shape having at least one acute angle.

The section, as viewed in the axial direction, of each of the first passages 51 formed between the radial bearing 33 and the housing 37 is a shape having two (in the range of "at least one") parts where it contacts the peripheral surface of the radial bearing 33 at an acute angle.

The second passage 52 is formed between the bottom surface 33b of the radial bearing 33 and the bottom closing part 39 of the housing 37, since the radial bearing 33 is press fitted into the housing 37 so that it is fixed in the condition of being spaced by a predetermined distance from the bottom closing part 39. Namely, the gap between the bottom surface 33b of the radial bearing 33 and the bottom closing part 39 functions as the second passage 51. Further, the bottom closing part 39 of the housing 37 is provided with inclined parts 39a corresponding to the positions where the first passages 51 are formed, and with step parts 39b formed in a circular circumferential shape at portions other than the portions where the inclined parts 39a are provided. Due to the presence of the inclined parts 39a, the second passages 52 are enlarged in sectional shape, and their function as air path is enhanced. Incidentally, the second passages 52 are not limited to this configuration; for example, the second passages may be formed between the bottom surface 33b of the radial bearing 33 and the bottom closing part 39 by forming grooves in the bottom surface 33b of the radial bearing 33 or in the inside surface of the bottom closing part 39.

The third passage 53 is formed between the top surface 33c of the radial bearing 33 fixed to the housing 37 and the seal member 40 of the housing 37. Namely, the gap between the top surface 33c of the radial bearing 33 and the seal member 40 functions as the third passage 53. Incidentally, the third passage 53 is not limited to this configuration; for example, the third passage may be formed between the top surface 33c of the radial bearing 33 and of the seal member 40 by forming grooves in the top surface 33c of the radial bearing 33 or in the inner side surface the seal member 40.

The communicating passages 50 including the first to third passages 51, 52, 53 configured as above provide communication between the open side and the non-open side of the rotating shaft 31 projecting from the radial bearing 33, to short-circuit the pressures in both regions, thereby preventing the static pressure on the non-open side from being lowered. Here, the open side of the rotating shaft 31 (hereinafter referred to also as "the shaft open side") means the top face side, or the side where the shaft passing hole 41 is provided, of the rotating shaft 31, whereas the non-open side of the rotating shaft 31 (hereinafter referred to also as "the shaft non-open side") means the bottom face side, or the side where the thrust bearing 34 is disposed, of the radial bearing 33.

Since the communicating passages 50 provide communication between the open side and the non-open side of the rotating shaft 31 protruding from the radial bearing 33, even when the rotating shaft 31 and the housing 37 rotate relative to each other with the result of generation of the dynamic pressure, the static pressure at the shaft end on the shaft non-open side where the rotating shaft 31 is not opened (released) is prevented from being lowered to cause generation of a negative pressure. Therefore, the communicating passages 50 can prevent the lubricating oil from being pushed out by expansion of residual air inside the housing 37 or of air dissolved in the lubricating oil due to a negative pressure or temperature rise generated inside the bearing unit, and can prevent the rotating shaft 31 from being pushed outward due to such expansion of air.

In addition, the communicating passages 50 function also as air vent at the time of inserting the rotating shaft 31 after assemblage of the housing 37. Specifically, the clearance between the outer peripheral surface of the rotating shaft 31 and the inner peripheral surface of the radial bearing 33 is usually a few micrometers. In view of this and the filling with the lubricating oil, therefore, the step of inserting the rotating shaft 31 would be difficult to carry out if the communicating passage(s) 50 as air path is not provided. In this embodiment, on the other hand, the communicating passages 50 play the role of air vent at the time of inserting the rotating shaft 31, thereby facilitating the insertion of the rotating shaft 31.

Thus, the communicating passages 50 having the function as air path play the role of air vent at the time of inserting the rotating shaft 31, and plays the role of a pressure short-circuit in the case where the residual air inside the bearing unit is expanded due to a negative pressure or temperature rise generated upon rotation of the rotating shaft.

Figure 7:
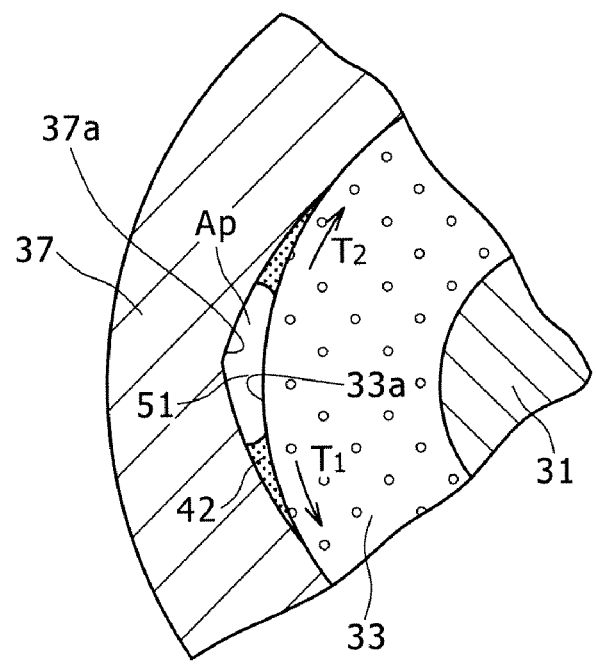
FIG. 7 is an enlarged sectional view showing a passage along a thrust direction which is formed between a housing and the radial bearing.

Further, the communicating passages 50 have the following merit. As shown in FIG. 6, the first passages 51 formed along the thrust direction each have a sectional shape including at least one acute angle such as to produce capillarity. Therefore, even in the case where the lubricating oil is present in the first passage 51, as shown in FIG. 7 the capillarity causes the lubricating oil to be pulled in the directions of arrows T1, T2 in FIG. 7 toward the acute angle portions, resulting in that an air flow passage $A_p$ as air path is formed without fail at a central portion of the first passage 51. In the case where the communication passage 50 is formed to be substantially circular in sectional shape in consideration of, for example, ease of the manufacturing process, the lubricating oil filling the inside of the bearing unit might stagnate in the communicating passage 50 to plug up the air path, resulting in that the function as air path cannot be exhibited sufficiently. On the other hand, the communicating passage 50 in this embodiment prevents the viscous fluid from stagnating to plug up the air path, and secures the air path assuredly, so that the communicating passage 50 can display the function as air path sufficiently.

Here, the sectional area of the first passage 51 and the magnitude of the acute angles possessed by the section are determined by taking into account the viscosity of the lubricating oil used, the materials of the housing and the radial bearing, and the like factors, whereby the first passage 51 can have a further appropriate function as air path.

Figure 8:
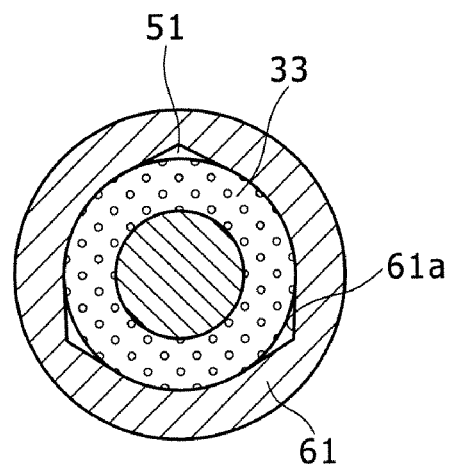
FIG. 8 is a sectional view showing another example of the housing and the radial bearing which define communicating passages.

Incidentally, while the sectional shape of the inner peripheral surface 37a of the housing for forming the first passage 51 of the communicating passage 50 has been a three-arc shape in the above embodiment, this configuration is not limitative; the sectional shape may be any one obtained by combining a polygon with arcs, i.e., any shape obtained from a polygon by replacing the edges wholly or partly by arcs. For example, as shown in FIG. 8, the inner peripheral surface 61a of a housing 61 may be formed in a tubular shape with a sectional shape obtained from a hexagon by replacing part of the edges by arcs.

Figure 9:
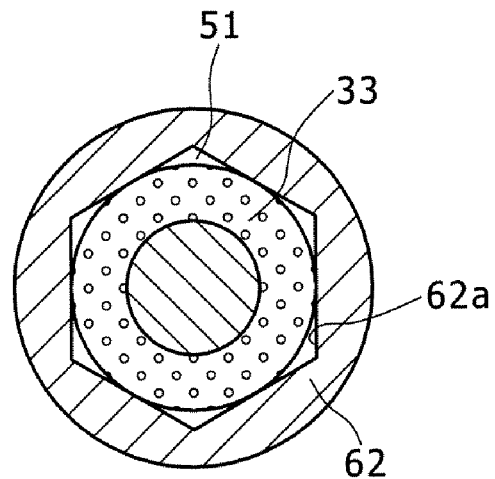
FIG. 9 is a sectional view showing a further example of the housing and the radial bearing which define communicating passages.

In addition, the shapes of the outer peripheral surface of the radial bearing and the inner peripheral surface of the housing, for forming the first passages of the communicating passages 50, are not limited to the above-mentioned. A configuration may be adopted in which the outer peripheral surface of the radial bearing has a substantially cylindrical shape and the inner peripheral surface of the housing has a tubular shape with a polygonal section. For example, as shown in FIG. 9, the inner peripheral surface 62a of a housing 62 may have a tubular shape with a hexagonal section.

Figure 10:
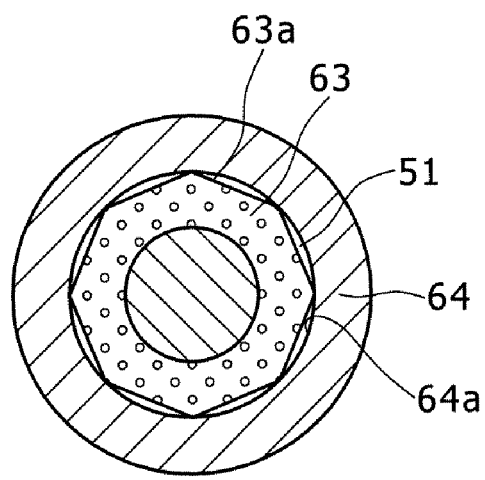
FIG. 10 is a sectional view showing yet another example of the housing and the radial bearing which define communicating passages.

Further, for forming the first passages of the communicating passages 50, a configuration may be adopted in which the outer peripheral surface of the radial bearing has a tubular shape with a polygonal section or a sectional shape obtained by combining a polygon with arcs whereas the inner peripheral surface of the housing has a substantially cylindrical shape. For example, as shown in FIG. 10, a configuration may be adopted in which the outer peripheral surface 63a of a radial bearing 63 has a tubular shape with a octagonal section whereas the inner peripheral surface 64a of a housing 64 has a substantially cylindrical shape.

Figure 11:
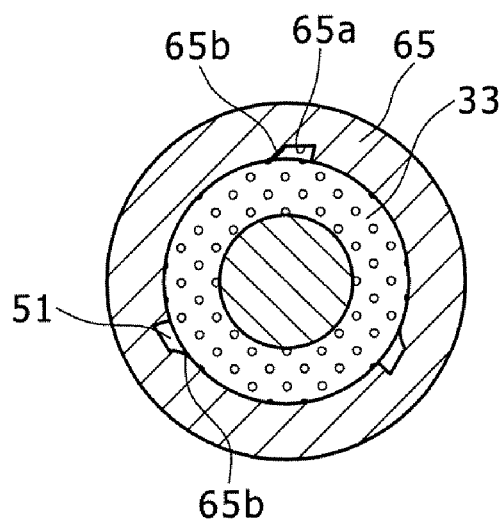
FIG. 11 is a sectional view showing a still further example of the housing and the radial bearing which define communicating passages.
Figure 12:
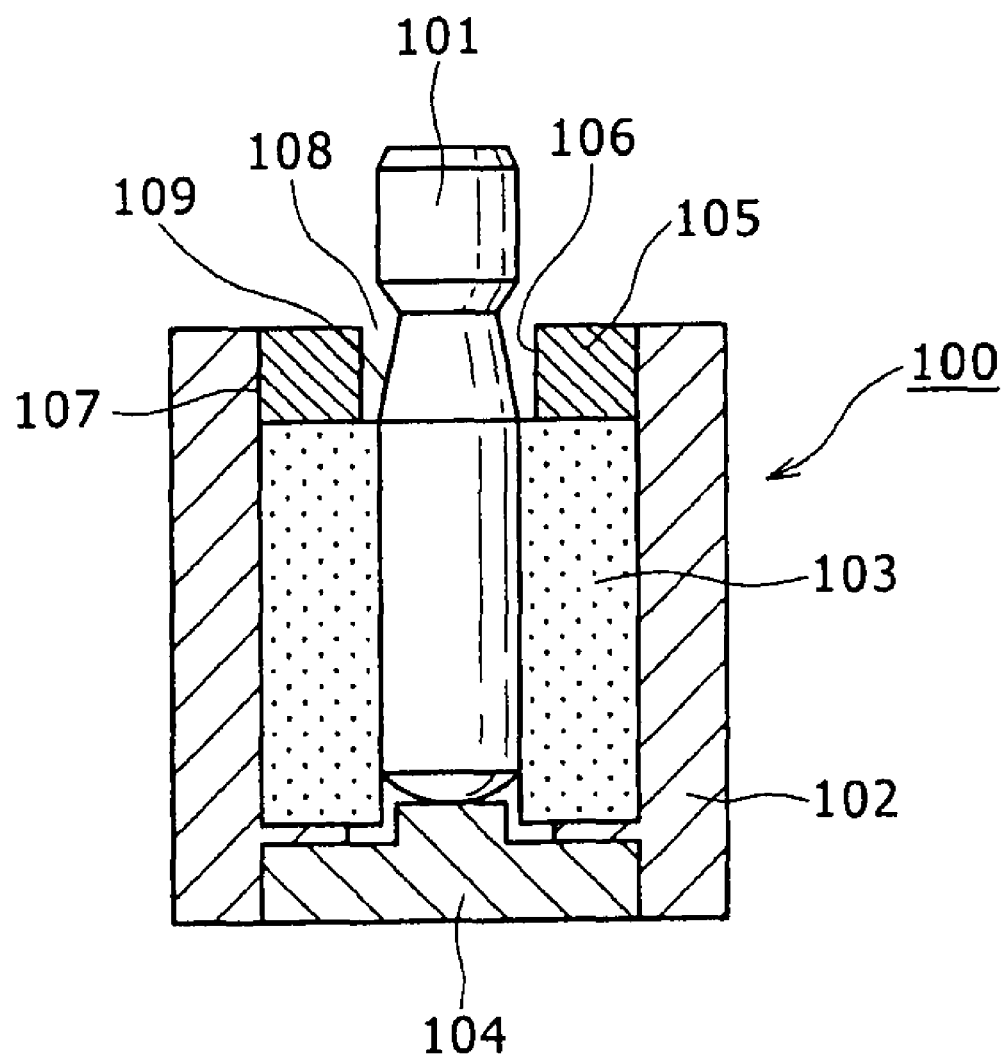
FIG. 12 is a sectional view showing a bearing unit used in the related art.

In addition, as shown in FIG. 11, a configuration may be adopted in which grooves 65a substantially rectangular in section are provided on the side of a housing 65, and the sectional shape of each groove 65a has an edge 65b on one side which contacts the peripheral surface of a radial bearing 33 at an acute angle.

Now, steps for manufacturing the bearing unit 30 to which the present invention is applied, configured as above, will be described below.

In manufacturing the bearing unit 30, tentative assemblage is conducted by mounting a housing body 38 to the outside of a radial bearing 33 and a thrust bearing 34. In this condition, the opening part of the housing body 38 is closed with a seal member 40, followed by adhering them. Next, a viscous fluid 42 (lubricating oil) is introduced, and finally a rotating shaft 31 is inserted. In this case, communicating passages 50 preliminarily provided functions securely as air vent, so that the insertion of the rotating shaft 31 can be carried out easily.

The bearing unit 30 configured as above solves the problem that the radial bearing 33 and the thrust bearing 34 bearing the rotating shaft 31 are surrounded by the housing 37 to thereby prevent the leakage of the lubricating oil very effectively but push-out of the lubricating oil is liable to be caused by the expansion of the residual air in the lubricating oil or of air dissolved in the lubricating oil which expansion occurs upon rotation of the rotating shaft.

To be more specific, the bearing unit 30 is provided with the communicating passage 50 extending from the lower end of the radial bearing 33 through a passage to the upper end of the radial bearing 33, and the communicating passage 50 functions as air vent, whereby a lowering in the static pressure on the shaft non-open side, or the side of the closed lower end of the radial bearing 33, can be restrained, and leakage of the lubricating oil due to push-up by the residual air can be prevented.

In addition, in the bearing unit 30, the first passage 51 formed along the axial direction, of the communicating passage 50, has such a cross-sectional shape as to produce capillarity, as above-mentioned, whereby stagnation of the viscous fluid in the passage is prevented. As a result, a lowering in the air path function due to plugging of the passage with the stagnating viscous fluid can be obviated, and the air path can be secured assuredly, whereby the air path function can be exhibited sufficiently.

The bearing unit 30 to which the present invention is applied, provided with the communicating passages 50 capable of functioning as air path assuredly, can prevent the pressure inside the housing 37 from being lowered upon relative rotation of the rotating shaft 31 and the housing 37, and can favorably discharge the residual air mixed into the viscous fluid such as the lubricating oil 42 placed to fill the inside of the housing 37. Therefore, it is possible to prevent the leakage phenomenon in which the lubricating oil 42 inside the housing 37 would be pushed out of the bearing unit due to the expansion of the residual air caused by a lowering in the pressure inside the housing 37. Thus, it is possible to securely retain the lubricating oil for a long time, and to maintain a good lubrication performance.

The driving motor 1 to which the present invention is applied includes the bearing unit 30 for rotatably bearing the rotor 11 relative to the stator 12. The provision of the bearing unit 30 makes it possible to prevent leakage of the lubricating oil from being generated, and to maintain a good lubrication performance for a long period of time.

The bearing unit according to an embodiment of the present invention is applicable not only to a cooling fan motor of a radiating device and a spindle motor of a disk drive but also to various driving motors.

Furthermore, the bearing unit according to an embodiment of the present invention is applicable not only to driving motors but also widely to mechanisms having a rotating shaft and to mechanisms for bearing a part rotated relative to a shaft.

It should be understood by those skilled in the art that various modifications, combinations, sub-combinations and alterations may occur depending on design requirements and other factors insofar as they are within the scope of the appended claims or the equivalents thereof.

What is claimed is:

1. A bearing unit comprising:
   a radial bearing for bearing in a circumferential direction of a shaft, the radial bearing having an outer peripheral surface that has a circular sectional shape as viewed in the axial direction;
   a thrust bearing for bearing one end in a thrust direction of said shaft;
   a housing provided on the outside of said radial bearing and said thrust bearing, said housing filled with a viscous fluid, the housing having an inner peripheral surface that has a cross-sectional shape that, as viewed in the axial direction, is defined by at least one of a plurality of intersecting arcs and a plurality of substantially straight intersecting lines, such that intersections of the at least one of the plurality of intersecting arcs and the plurality of intersecting lines are vertices of the cross-sectional shape of the inner peripheral surface;
   a seal member united with said housing so as to contain said radial bearing and said thrust bearing in a sealed state, said seal member having a shaft passing hole through which said shaft is passed; and
   a passage for discharging air present inside said housing, said passage formed between said inner peripheral surface of the housing and said outer peripheral surface of the radial bearing and bounded in part by a vertex of the inner peripheral surface of the housing, and said passage providing communication between said one end and the other end in said thrust direction of said shaft projecting from said radial bearing,
   wherein a cross-sectional shape of said passage is a shape including at least one acute angle, the acute angle being on a plane parallel to the cross-sectional shape of the passage.

2. The bearing unit according to claim 1, wherein the cross-sectional shape of the inner peripheral surface of the housing substantially forms a Reuleaux Triangle.

3. The bearing unit according to claim 1, wherein the cross-sectional shape of the inner peripheral surface of the housing substantially forms a hexagon.

4. The bearing unit according to claim 1, wherein the radial bearing includes dynamic pressure grooves on an interior surface of the radial bearing.

5. The bearing unit according to claim 4, wherein the dynamic pressure grooves are V-shaped.

6. A driving motor comprising:
   a bearing unit for bearing a rotor rotatably relative to a stator,
   wherein said bearing unit includes:
      a radial bearing for bearing in a circumferential direction of a shaft, the radial bearing having an outer peripheral surface that has a circular sectional shape as viewed in the axial direction;
      a thrust bearing for bearing one end in a thrust direction of said shaft;
      a housing provided on the outside of said radial bearing and said thrust bearing, said housing filled with a viscous fluid, the housing having an inner peripheral surface that has a cross-sectional shape that, as viewed in the axial direction, is defined by at least one of a plurality of intersecting arcs and a plurality of substantially straight intersecting lines, such that intersections of the at least one of the plurality of intersecting arcs and the plurality of intersecting lines are vertices of the cross-sectional shape of the inner peripheral surface;
      a seal member united with said housing so as to contain said radial bearing and said thrust bearing in a sealed state, said seal member having a shaft passing hole through which said shaft is passed; and
      a passage for discharging air present inside said housing, said passage formed between said inner peripheral surface of the housing and said outer peripheral surface of the radial bearing and bounded in part by a vertex of the inner peripheral surface of the housing, and said passage providing communication between said one end and the other end in said thrust direction of said shaft projecting from said radial bearing, and
      wherein a cross-sectional shape of said passage is a shape including at least one acute angle, the acute angle being on a plane parallel to the cross-sectional shape of the passage.

7. The driving motor according to claim 6, wherein the cross-sectional shape of the inner peripheral surface of the housing substantially forms a Reuleaux Triangle.

8. The driving motor according to claim 6, wherein the cross-sectional shape of the inner peripheral surface of the housing substantially forms a hexagon.

9. The driving motor according to claim 6, wherein the radial bearing includes dynamic pressure grooves on an interior surface of the radial bearing.

10. The driving motor according to claim 9, wherein the dynamic pressure grooves are V-shaped.

* * * * *